United States Patent [19]

Ingalls et al.

[11] 4,420,272
[45] Dec. 13, 1983

[54] METHOD AND STRUCTURE FOR BEARING THE ECCENTRICITY OF A BUSHING BORE

[76] Inventors: William E. Ingalls, Longmont; Thomas W. O'Rourke, Boulder, both of Colo.

[21] Appl. No.: 423,894

[22] Filed: Sep. 27, 1982

[51] Int. Cl.³ ............................................. F16D 1/00
[52] U.S. Cl. ........................................ 403/4; 403/27; 403/162; 280/661
[58] Field of Search ................... 403/4, DIG. 8, 122, 403/162, 27; 280/661

[56] References Cited

U.S. PATENT DOCUMENTS

| | | | |
|---|---|---|---|
| 2,923,555 | 2/1960 | Kost et al. | 280/661 X |
| 3,124,370 | 3/1964 | Traugott | 280/661 |
| 3,385,624 | 5/1968 | Baclini | 403/4 X |
| 4,026,578 | 5/1977 | Mattson | 280/661 |
| 4,231,588 | 11/1980 | Wotton | 403/161 X |
| 4,243,339 | 1/1981 | Dickerson | 403/4 |
| 4,252,338 | 2/1981 | Ingalls et al. | 280/661 |

*Primary Examiner*—Andrew V. Kundrat
*Attorney, Agent, or Firm*—O'Rourke & Harris

[57] ABSTRACT

A bushing formed of an outer body and an inner sleeve member adapted to rotate within the outer body, the outer body having a bore adapted to rotatably receive the inner sleeve member such bore being eccentric, i.e. offset and/or skewed, relative to the axis around which the outer surface of the outer body is generated, and the inner end member having a usually tapered bore similarly eccentric to the axis of the outer surface of the inner sleeve member such that the inner member may be rotated relative to the outer body with the eccentricity of the bore of the outer body and the bore of the inner member either being additive or cancelling such that the effective eccentricity of the inner bore may be adjusted to the outer surface of the outer body to provide, for instance, caster and camber compensating bushings for vehicles, and other similar eccentric bushing uses.

11 Claims, 5 Drawing Figures

METHOD AND STRUCTURE FOR BEARING THE ECCENTRICITY OF A BUSHING BORE

BACKGROUND OF THE INVENTION

1. Field of the Invention

This invention relates generally to a bushing which may be adjusted such that the inner bore eccentricity relative to the outer bushing surface is infinitely variable within a given range. More particularly, the invention relates to a method and structure in which by a simple rotation of an inner sleeve member carried in an eccentric bore in an outer body, the effective eccentricity of the inner bore relative to the outer surface of the bushing may be varied to provide appropriate compensation for, for instance, providing for correction of vehicle alignment, particularly caster and camber of vehicles utilizing ball joint members.

DESCRIPTION OF THE RELATED ART

Use of eccentric devices such as offset ball joints, offset bushings, etc. for alignment correction of vehicles, such as 4-wheel drive, solid axle, independent A-arms and McPherson-type strut suspensions have been known for some time. For instance, Kost et al U.S. Pat. No. 2,923,555 discloses a number of arrangements in which eccentric ball joint housing and members receiving ball joints are utilized to permit correction of front wheel alignment. In all instances, the eccentricity is a constant factor and alignment is accomplished by moving the upper ball joint relative to the lower ball joint as a result of rotation of the fixed eccentric ball joint member.

Somewhat similarly, in Mattson U.S. Pat. No. 4,026,578, an eccentric bore is provided in the movable bottom portion of the McPherson strut suspension, the bore being adapted to receive a ball joint shaft such that rotation of the eccentric bottom portion will induce a circular oscillation of the bottom portion of the McPherson strut, thereby allowing for both caster and camber adjustment, but only as a compromise since the eccentricity is fixed and caster can be accomplished only with the current variations in the camber setting.

A more refined concept is disclosed in Ingalls et al U.S. Pat. No. 4,252,338 which discloses a bushing having one of several selected but fixed eccentricities such that a correction of any particular caster/camber combination may be accomplished by selecting one of the set of eccentric bushings and positioning the bushing to induce appropriate changes in caster and/or camber.

Given the fundamental nature of eccentric bushings, i.e. adjustment through rotation, it is of course recognized that rotation of the bushing provides concurrent orthogonal corrections, caster and/or camber in the case of automotive suspensions. Ingalls et al compensates for this by providing a selection of bushings having various eccentricities, but this only at the expense of greater inventories and production costs of the bearing bushings.

SUMMARY OF THE INVENTION

The present invention, which provides a heretofore unavailable convenience and economy in eccentric bushings, comprises an adjustable eccentric bushing having an outer body with an eccentric bore defined therein, and an inner sleeve member positioned within the outer body eccentric bore with the inner member in turn having an eccentric bore therein. Accordingly, by rotating the inner sleeve member within the outer body, the two eccentric bores may add or cancel thus changing the effective eccentricity of the bore of the inner body relative to the outer surface of the outer body. In a preferred embodiment, the effective eccentricities of the two bores are the same, and thus in one position functionally cancel one another to provide in effect a zero offset bushing. However, by rotation of the inner member 180° relative to the outer body, the eccentricities become additive thereby providing substantial eccentricity between the bore of the inner body and the surface of the outer body. Of course any position between zero and full eccentricity may be accomplished as a function of rotation of the inner member within the outer body. Thus a single bushing function can provide a variable eccentricity having utility in any of the uses, such as those described above, which specify the use of an eccentric bushing, though conventionally an eccentric bushing having a fixed eccentricity.

DETAILED DESCRIPTION OF THE INVENTION

Figure 1:
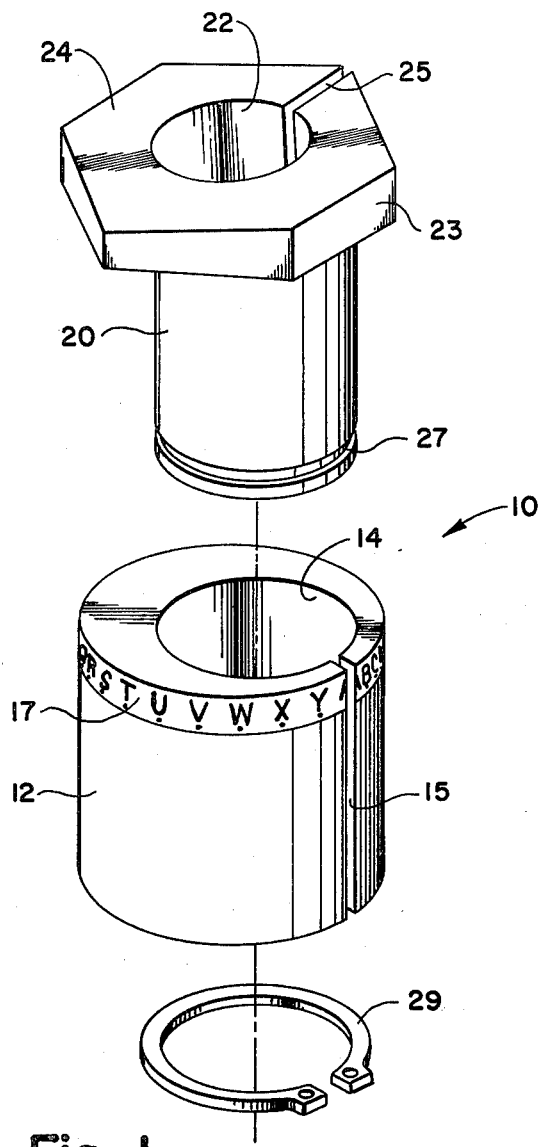
FIG. 1 is an exploded perspective view of a bushing structure having variable eccentricity in accord with a preferred embodiment of the instant invention.
Figure 3:
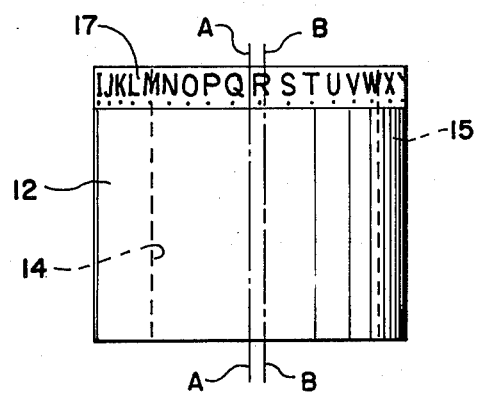
FIG. 3 is a side view of the outer body portion of the bushing structure of FIG. 1.

Turning now to the drawings, wherein like elements are designated by like reference numerals through the various figures, a variable eccentricity bushing assembly according to the instant invention is illustrated in FIG. 1 and generally designated by reference numeral 10. As shown in FIG. 1, eccentric bushing assembly 10 comprises an outer body preferably in the form of a cylindrical member having an axis A—A, but in some cases a tapered member or a member having a threaded outer portion, with an eccentric bore 14 having an axis B—B defined therethrough. As used herein, eccentric bore is defined as a bore having axis B—B displaced or skewed relative to axis A—A of the outer surface of the member in which it is defined. Accordingly, in FIGS. 1 and 3, body 12 is illustrated as having a cylindrical outer bore and eccentric bore 14 is illustrated as being offset, i.e. axis B—B parallel to axis A—A of the outer surface of body 12, but displaced therefrom. Operably, bore 14 could be tapered or of any other shape adapted to receive another member as will be described below. As is conventional, body 12 includes a slot 15 defined inward from the outer surface thereof into bore 14. In some applications, slot 15 may be omitted. Indicia 17 are defined around the periphery of the outer surface of body 12 to aid in orienting eccentric bushing assembly 10 as will be described below. In other applications, slot 15 may also serve as a locating means.

Figure 2:
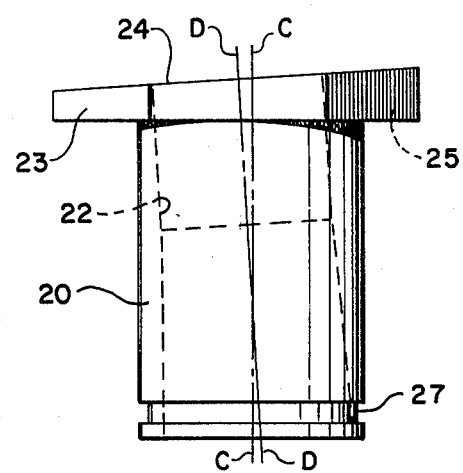
FIG. 2 is a side view of the inner sleeve portion of the bushing structure of FIG. 1.

Also with reference to FIGS. 1 and 2, inner sleeve member 20 is illustrated as including an outer cylindrical surface around axis C—C sized and configured to fit tightly but movably within bore 14 of outer body 12. Sleeve member 20 includes an eccentric bore 22, illustrated as having axis D—D skewed relative to the outer surface of inner sleeve member 20, but operably offset or otherwise eccentric as described above. Surface 24 of inner sleeve member 20 is tapered in that the upper surface 24 is perpendicular to the axis of skewed eccentric bore 22 while the lower surface is perpendicular to the outer surface of the portion of inner member 20 adapted to fit within eccentric bore 14. As illustrated, hex head 23 is defined on the upper portion of inner member 20 to assist in removal and/or rotation of variable eccentricity bushing assembly 10 in typical installations. Other specific configurations may of course be provided for varying applications. Slot 25 is defined along the entire length of inner member 20 from the outer portion, illustrated from a point of hex head 23, to eccentric bore 22 defined therethrough. At the bottom portion of inner sleeve member 20, groove 27 is circumferentially defined therearound as illustrated. Accordingly, when inner member 20 is inserted through bore 14 of outer body 12, the lower portion of inner member 20 will protrude such that snap ring 29 may be positioned in groove 27 to secure the entire eccentric bushing assembly 10 together.

Figure 4:
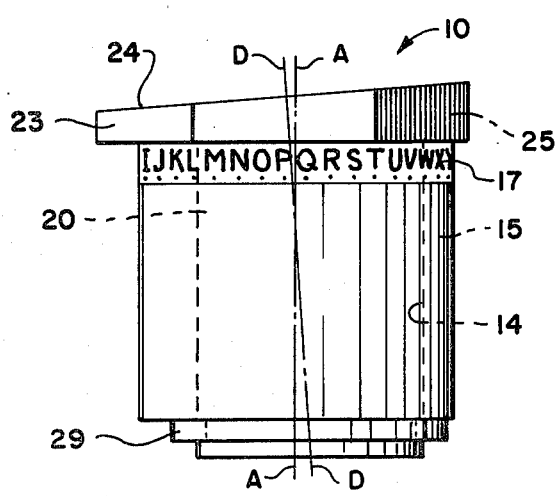
FIG. 4 is a side view illustrating the components of FIGS. 2 and 3 assembled to provide an effective zero eccentricity within the bushing.
Figure 5:
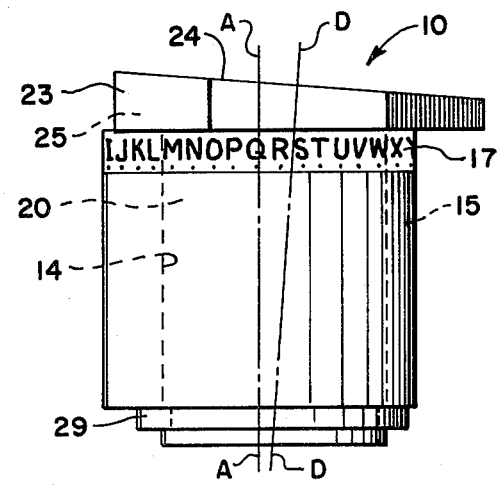
FIG. 5 is a side view illustrating the components of FIGS. 2 and 3 assembled in a 180° relationship from that shown in FIG. 4 to provide maximum effective eccentricity.

As illustrated in FIG. 4, inner sleeve member 20 is positioned with an outer body 12 such that the eccentric bore 22 of inner sleeve member 20 cancels eccentric bore 14 of outer body 12 at the intersection of the two axes. Particularly in the instant of automotive applications utilizing ball joints and with regard to eccentric bushing assembly 10 utilizing skewed eccentricities, the eccentricity is measured at the center of rotation of a ball joint (not shown). Accordingly, if skewed eccentric bore 22 is positioned such that axis D—D thereof intersects axis A—A of the outer surface of body 12 at the center of rotation of a ball joint carried in the bushing assembly 10—which position may be spaced from the bushing assembly 10—a zero offset of the ball joint relative to the bushing assembly 10 will result. This would, for purposes of illustration, be spaced above assembly 10 as shown in FIG. 4, but the offset may be below in other more realistic applications. Thus the functional eccentricity of bushing assembly 10 may depend upon the use at a given position of member 20 in member 10. If both members 12 and 20 utilize purely offset bores, i.e. in which the bore axis is parallel but offset from the outer surface of the member in which it is formed, the displacement is identical anywhere along the axis of the bushing member. The example shown in FIGS. 4 and 5, in which a skew bore 22 is employed with an offset bore 14, is a more complicated situation. It will be recognized that the effective eccentricity of bushing assembly 10 is a function of the axial displacement of the point of measurement. As discussed above and as shown in FIG. 4, a functional zero offset is provided at the intersection of axis D—D of skewed eccentric bore 22 with axis A—A of the outer surface of body 12, within bushing assembly 10. On the other hand, as shown in FIG. 5, with inner sleeve member 20 rotated 180° from the position shown in FIG. 4, the eccentricity of offset bore 14 and the eccentricity of skewed eccentric bore 22 are additive above bushing assembly 10 thereby substantially increasing the functional eccentricity of variable eccentricity bushing assembly 10. By merely rotating inner sleeve member 20 relative to outer body 12, an infinite adjustment of effective eccentricity can be accomplished.

Though not necessary, it is preferred that the eccentricity of inner sleeve member 20 at bore 22 and the eccentricity of bore 14 of outer body 12 be effectively identical so that cancellation to zero may be accomplished at one orientation, and the eccentricity of the two bores thereafter added one to the other as the rotation of inner member 20 progresses. To increase the range of correction through the eccentric bores, in certain instances it may be desirable to have the "offsetting" orientation less than fully cancelling. Thereafter rotation of inner sleeve member 20 in outer body 12 will add additional corrective eccentricity to the already positive quantity available when fully offsetting.

In operation, variable eccentricity bushing 10 of the instant invention may be employed in any number of uses in which bushings having nonconcentric bores are desirable. Typical of such uses is the structure disclosed in Ingalls et al U.S. Pat. No. 4,252,338 wherein an eccentric bushing employed to correct an automotive suspension system. In such uses bushing assembly 10 is employed by referring to a chart to determine the position of, for instance, indicia 17 of outer body 12 relative to some position on inner sleeve member 20, typically slot 25. When slot 25 is set at a particular of indicia 17, a particular offset is produced in bushing assembly 10. Thereafter, indicia 17 may be employed in a second step to orient the position of bushing assembly 10, as described in U.S. Pat. No. 4,252,338, in a vehicle to compensate for caster and/or camber. Disclosure of U.S. Pat. No. 4,252,338 is hereby incorporated by reference with regard to such application.

In addition to indicia 17, markings (not shown) may be provided on inner sleeve member 20 in that the marking and indicia may thereby be aligned, and the aligned combination thereof utilized to orient bushing assembly 10 when installed. Of course, each use, and particularly each vehicle when used to align vehicles, will involve different charts of empirically derived settings to provide appropriate corrections as a result of the differing geometries of such varying vehicles.

Although only limited embodiments and applications of the bushing to which the instant invention pertains have been particularly illustrated and described, it is to be understood that other equivalent embodiments will be apparent to those skilled in the art, and the invention is to be limited only by the following claims.

What is claimed is:

1. A bushing assembly having an infinitely variable eccentricity within a given range, the bushing assembly comprising:

an outer body member having an outer body surface defined around a first axis, and an inner bore defined therethrough around a second axis eccentric to the first axis; and an inner sleeve member having an outer surface complementary in shape to the outer body member inner bore and defined around a third axis, and having an inner bore defined therethrough around a fourth axis eccentric to the third axis, the inner sleeve member being rotatably positioned within the bore of the outer body member, and at least one pair of the outer body pair of axis and inner sleeve pair of axis being in a skewed relationship;

whereby the eccentricity of the inner sleeve member bore relative to the outer body member outer surface may be varied by rotating the inner sleeve member within the outer body member.

2. A bushing assembly as set forth in claim 1 in which the outer body member outer surface is cylindrical in shape.

3. A bushing assembly as set forth in claim 1 in which the inner sleeve member bore is tapered and adapted to receive the tapered shaft of a ball joint.

4. A bushing assembly as set forth in claim 1 in which at least one pair of the outer body pair of axes and the inner sleeve member pair of axes are offset one from the other, but parallel one to the other.

5. A bushing assembly as set forth in claim 1 in which the outer body member and the inner sleeve member each have a longitudinal slit defined from the outer surface and extending into the bore, the slits being substantially aligned with the first and third axis, respectively.

6. A bushing assembly as set forth in claim 1 in which the inner sleeve member has defined at one end thereof a hexagonal surfaced head of a dimension greater than the inner bore of the outer body member, and at the other end thereof a circumferential groove defines around the outer surface of the inner sleeve member, and further includes a snap ring positioned in the inner sleeve member groove to maintain the bushing assembly together.

7. A bushing assembly having an infinitely variable eccentricity within fixed range, bushing assembly comprising:

an outer body member of cylindrical configuration defined around a first axis, and an inner bore defined therethrough around a second axis eccentric to the first axis, the outer body member having a longitudinal split defined from the outer surface thereof to the inner bore;

an inner sleeve member having an outer surface complementary in shape to the outer body member inner bore defined around a third axis, an inner bore defined therethrough around a fourth axis eccentric to the third axis, and a longitudinal split defined from the outer surface thereof to the inner bore, the inner sleeve member further including at one end thereof a hexagonal head portion of a dimension greater than the inner bore of the outer body member, and at the end opposite thereof as the hexagonal head a circumferential groove defined therearound; and the inner sleeve member being rotatably fitted within the outer body member inner bore and the assembly further including a snap ring positioned in the inner sleeve member circumferential groove.

8. A bushing assembly as set forth in claim 7 in which at least one inner sleeve member and outer body member have defined thereon indicia to facilitate positioning of the inner sleeve member within the outer body member at desired orientations.

9. A bushing assembly as set forth in claim 7 in which the end surface of the hexagonal head defined on the inner sleeve member comprises a planar surface positioned perpendicular to the inner sleeve member inner bore axis.

10. A method for infinitely varying an eccentric inner bore in a bushing assembly relative to the outer surface of the busing assembly, the method comprising:

rotating an inner sleeve member within an outer body member, the outer body member having an outer body surface defined around a first axis an inner bore defined therethrough around a second axis eccentric to the first axis and the inner sleeve member having an outer surface complementary in shape to the outer body member inner bore and defined around a third axis, having an inner bore defined therethrough around a fourth axis eccentric to the third axis with at least one the first and second pair of axis and the third and fourth axis being in a skewed relationship; and stopping the rotation of the inner sleeve member within the outer body member when the effective eccentricity of the fourth axis relative to the outer body member outer surface is at a desired value;

whereby by varying the amount of rotation of the inner sleeve member relative to the outer body member an infinite range of eccentricities may be provided within the fixed range.

11. A method of bearing the eccentricity of a bushing assembly as set forth in claim 10 in which the desired eccentricity is accomplished by rotating the inner sleeve member to align a predetermined mark on the outer body member with a corresponding mark on the inner sleeve member.

* * * * *